(12) United States Patent
Louden

(10) Patent No.: US 7,798,534 B2
(45) Date of Patent: Sep. 21, 2010

(54) ELECTRICAL CONDUIT UNION AND CONDUIT SYSTEM

(75) Inventor: R K Louden, Salisbury, PA (US)

(73) Assignee: Braddock View Management, Inc., Mt. Braddock, PA (US)

( * ) Notice: Subject to any disclaimer, the term of this patent is extended or adjusted under 35 U.S.C. 154(b) by 21 days.

(21) Appl. No.: 11/162,414

(22) Filed: Sep. 9, 2005

(65) Prior Publication Data

US 2005/0285397 A1  Dec. 29, 2005

Related U.S. Application Data

(63) Continuation of application No. 10/051,404, filed on Jan. 18, 2002, now abandoned.

(51) Int. Cl.
*F16L 25/00* (2006.01)

(52) U.S. Cl. ...................... 285/333; 285/392

(58) Field of Classification Search .................... 285/36, 285/89, 92, 392, 369, 40, 333, 398, 371; 411/246–249, 301–309
See application file for complete search history.

(56) References Cited

U.S. PATENT DOCUMENTS

| | | | |
|---|---|---|---|
| 503,433 A | * | 8/1893 | McIntyre ..................... 285/357 |
| 4,060,264 A | | 11/1977 | Gajajiva |
| 4,091,523 A | | 5/1978 | Reicke |
| 4,564,225 A | | 1/1986 | Taylor |
| 5,048,871 A | * | 9/1991 | Pfeiffer et al. ............... 285/333 |
| 2002/0185862 A1 | | 12/2002 | Louden |

* cited by examiner

*Primary Examiner*—Aaron Dunwoody
(74) *Attorney, Agent, or Firm*—Law Offices of Metzger and Thatcher, LLC; Stephanie E. Thatcher, Esq.

(57) ABSTRACT

An electrical conduit piece of the invention has two external threaded regions, one threaded region having a left hand threaded region and one having a right hand threaded region. This conduit piece is particularly well adapted to be used in conventional conduit systems by coupling two conventional conduit pieces through a coupling of the invention having two internal threaded regions, one threaded region having left hand threads and the other threaded region having right hand threads. A groove may be formed in the internal wall of the coupling, e.g., at or near its longitudinal center to provide an open region in which ends of conduit pieces inserted into the coupling can abut. Residing in the grooved region of the coupling is a locking ring which scores the threads of the conduit pieces at 90° preventing any tangential force from outside of the system from unscrewing one of the conduit pieces from the coupling. In a preferred embodiment, the conduit piece is embodied as a curved or elbow conduit.

2 Claims, 4 Drawing Sheets

ELECTRICAL CONDUIT UNION AND CONDUIT SYSTEM

CROSS-REFERENCE TO RELATED APPLICATIONS

This application is a continuation of U.S. application Ser. No. 10/051,404 filed Jan. 18, 2002, now abandoned.

BACKGROUND OF THE INVENTION

Field of the Invention

The present invention relates to a novel electrical conduit system for encasing and protecting flexible wires or cables, being particularly adapted to adhere to the stricter levels of the electrical code.

Description of the Currently Available Technology

In construction and architectural applications, electrical conduit systems are used to encase and protect flexible delicate or dangerous lines or cables, such as electrical power lines, telephone lines, fiber optic cables, computer network cables, etc. Such electrical conduit systems are used, for example, within the walls of buildings, underground, and for exposed above-ground outdoor applications. Conventional electrical conduit systems consist of individual conduit sections or pieces usually made of rigid material, such as galvanized or stainless steel, PVC, or aluminum, coupled together to form the conduit system, generally referred to as a "conduit run".

Examples of conventional electrical conduit pieces include the following: straight conduit sections, generally of several feet in length and in varying diameters, with exterior or male threads on each end; nipples, which generally are shorter straight conduit sections of various diameters with exterior or male threads on each end; and elbows, which are generally bent or curved conduit sections also with exterior or male threads on each end. By standard convention, the threads on the ends of the conventional conduit pieces are all right hand threads. Adjacent conduit pieces are connected together by a female coupling having continuous, internal right hand threads.

To construct a conventional electrical conduit system, a first conduit piece, for example a nipple, is secured at one end of the conduit run, usually at the feed end. A female coupling is then screwed onto the outer end of the first conduit piece until seated. Then, a second conduit piece, for example a straight ten-foot section or an elbow, is inserted into the other end of the female coupling and turned to thread it into the female coupling to connect the second conduit piece to the first conduit piece. Additional conduit pieces, connected by additional female couplings, are successively added to form the electrical conduit system. The sections or pieces may be attached to walls or suspended from a ceiling by various known methods.

There are, however, several drawbacks to conventional electrical conduit systems. Although conventional electrical conduit systems are generally acceptable for protecting cables, once formed it becomes difficult to reenter or access an intermediate section of the conduit system. Such reentry typically entails complete disassembly of the conduit system from one end to the point of desired access due to the successive coupling of each conduit piece to form the conduit system. This disassembly is often both costly and labor intensive.

Alternatively, for complex conduit systems, the point of desired access is sometimes gained to intermediate sections by destructive means, generally involving pipe cutting and wire pulling or cutting. This creates the obvious risk of further damaging the wires or cables housed by the conduit system, and also creates a difficulty in having to replace the destroyed conduit piece. This is especially so when the destroyed conduit piece is of a curved nature and there is insufficient room to rotate the replacement conduit piece.

Additionally, when constructing a large, electrical conventional conduit system, the significant weight and size of the conduit pieces require considerable manpower to align the pieces correctly and then to rotate them to screw them into the system. Clearly, the manpower required to align and rotate such large, heavy conduit pieces creates an increased cost of construction.

Furthermore, since the conventional conduit pieces must be rotated during construction of the electrical conduit system, the cables or wires to be protected cannot be pre-positioned inside the disassembled conduit pieces. Rather, after the entire conduit system has been constructed, the cables or wires are typically pulled through the entire conduit system from one end to the other. This pulling may damage the cables or wires and is particularly disadvantageous for fiber optical cables. Since there are generally four or more fiber optical cables in conventional systems, the fiber optic cables are placed in spacers within the conduit system, which can easily become broken, damaged or misaligned during the pulling process.

Therefore, several complex clamping devices have been developed and are commonly employed to alleviate the above-described problems encountered with a conventional electrical conduit system. One such device comprises a split sleeve with an internal threaded region on both sections. The device is bolted over the external threaded region of two components thereby connecting them.

Another device, referred to as an "Erickson" coupling, is comprised of a first sleeve with an internal threaded portion and an internal flange. The first sleeve is slipped over the end of one of the conduit sections and the second sleeve is threaded onto the end of the same conduit. The third sleeve is comprised of an interior threaded portion and an exterior flange and threaded surface. The interior threaded portion of the third sleeve is threaded onto a second conduit piece. The first sleeve is slipped back along the first conduit, fitted over the second sleeve and subsequently rotated or threaded onto the third sleeve. A secure joint is completed as the second sleeve abuts the interior flange of the first sleeve, the first sleeve being threaded against the exterior flange of the third sleeve.

A third method is also employed using the device described in U.S. Pat. No. 4,091,523 (Reicke). The description of the device from the abstract cites: A sleeve having first and second interior surface portions. The first surface portion is threaded and communicates with one open end of the sleeve, the second surface portion is smooth and communicates with the opposite open end of the sleeve. A bore is formed through the sleeve and the second surface portion thereof and a set screw is threaded into the bore. The sleeve is first slipped, and then threaded, onto a first conduit, the conduit being first received by the smooth interior surface and then by the threaded interior surface. The end of the second conduit is then disposed adjacent the sleeve, and the sleeve is screwed back off the first conduit onto the second conduit until the first conduit is received by the smooth interior surface and the second conduit by the threaded interior surface. The set screw is threaded against the first conduit.

These methods using known clamping devices, however, also have several disadvantages. They tend to be expensive to purchase and to install. Additionally, they possess the disadvantage of being bulkier than the original conduit system, thereby requiring a larger free space between parallel or adjacent conduit runs, or a larger free space within confined areas. Further, the aforementioned method devices consist of numerous parts which may become misplaced or lost.

Additionally, several of the above-described devices are of limited use because they are not approved for use in certain types of installations, particularly explosion proof installations, as defined by the various electrical codes. Sufficient thread engagement to cool flame under pressure, and the abutting of conduit section pieces to prevent the current from an electrical short from arcing across the conduit section to the coupling and arcing back across the coupling to the conduit section are required in explosion proof installations. Thus, these devices are useless alternatives when performing or fixing explosion proof installations.

Another device, described at U.S. Pat. No. 4,060,264 (Gajajiva), attempts to solve this dilemma, and provides for a swivel coupling with a resilient seal and a non-centered recess which forces a non-arcing ground. However, while this invention reaches the standard for explosion proof installations in relation to arcing, it fails to assure sufficient thread engagement, required for stricter code installations.

Given the above information, it is clear that a novel electrical conduit piece, and corresponding conduit system, are greatly needed to provide a less burdensome and less expensive means to building and allowing repair access to conduit systems, and which particularly are acceptable under the strictest electrical codes for use in explosion proof installations.

SUMMARY OF THE INVENTION

A conduit system of the invention comprises a plurality of conduit pieces, at least one of the conduit pieces comprising a first conduit piece having a first end with a first threaded region and a second end with a second threaded region. A coupling of the invention is configured to engage at least one end of the first conduit piece and one end of an adjacent conduit piece. The coupling comprises a first threaded portion and a second threaded portion, with a groove region located therebetween and with the first threaded portion of the coupling being of different thread direction than the second threaded portion, the recess being necessary for the pieces to abut while maintaining sufficient thread engagement for conduit fittings. The locking ring of the invention comprises an open ended ring with spring like characteristics and coarse threads, which, when seated in the internal grooved section of the coupling lie perpendicular to the threaded portion of the coupling and conduit piece. The locking ring is unattached to the coupling and remains in place by spring tension.

Another conduit system of the invention comprises a plurality of first conduit pieces, each having a first end with a first threaded region and a second end with a second threaded region. The first and second threaded regions have substantially the same first thread direction. At least one second conduit piece is provided having a first end with a first threaded region and a second end with a second threaded region, with the first and second threaded regions of the second conduit piece each having substantially the same second thread direction and with the second thread direction being different than the first thread direction. At least one coupling is provided and comprises a first threaded portion and a second threaded portion, with the first threaded portion having a different thread direction than the second threaded portion, with the first threaded portion of the coupling configured to reversibly engage the first threaded region on the first conduit piece, and with the second threaded portion of the coupling configured to reversibly engage the second threaded region on the second conduit piece to reversibly couple the first conduit piece with the second conduit piece. As the first threads of the two conduit pieces enter the internal grooved area, the coarse threads of the locking ring score the threads of the two conduit pieces at 90° until the rotation of the coupling part forces the ends of the two conduit pieces to abut.

A further conduit system is provided comprising a plurality of first conduit pieces having a first end and a second end, with first externally threaded regions located at each end, and with each first threaded region comprising right hand threads. A plurality of second conduit pieces is provided, each having a first end and a second end, with second, externally threaded regions located at each end, each second threaded region comprising left hand threads. A coupling is located between adjacent first and second conduit pieces and is configured to reversibly engage one end of the first conduit piece with one end of the adjacent second conduit pieces, the coupling comprising a first, internally threaded, right hand thread portion configured to engage an end of a first conduit piece and a second, internally threaded, left hand thread portion configured to engage an end of a second conduit piece. The coupling has an internal groove region positioned such that when the coupled ends of the first and second conduit piece are inserted into the coupling, the inserted ends of the conduit pieces abut in the internal groove region. As the first threads of the two conduit pieces enter the internal grooved area, the coarse threads of the locking ring score the threads of the two conduit pieces at 90° until the rotation of the coupling part forces the ends of the two conduit pieces to abut.

An electrical conduit piece of the invention has threaded regions, particularly external, left hand, tapered or straight threaded regions at each end. This conduit piece is particularly well adapted to be used in conventional conduit systems by coupling two conventional conduit pieces through a coupling of the invention having two internal threaded regions, one threaded region having left hand threads and the other threaded region having right hand threads. A groove may be formed in the internal wall of the coupling, e.g., at or near its longitudinal center to provide an open groove region in which ends of the conduit pieces inserted into the coupling can abut. A locking ring is provided in the invention to prevent either one of the conduit ends from becoming unthreaded should tangential force be applied to rotate one of the conduit pieces at some point outside the system through improper installation. In a preferred embodiment, the conduit piece is embodied as a curved or elbow conduit and would not need the locking ring.

A further embodiment of the invention comprises a conduit piece having external, right hand threads at one end and external, left hand threads at the other end. The conduit pieces and coupling of the invention can be used in constructing new electrical conduit systems or in retrofitting existing conduit systems.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
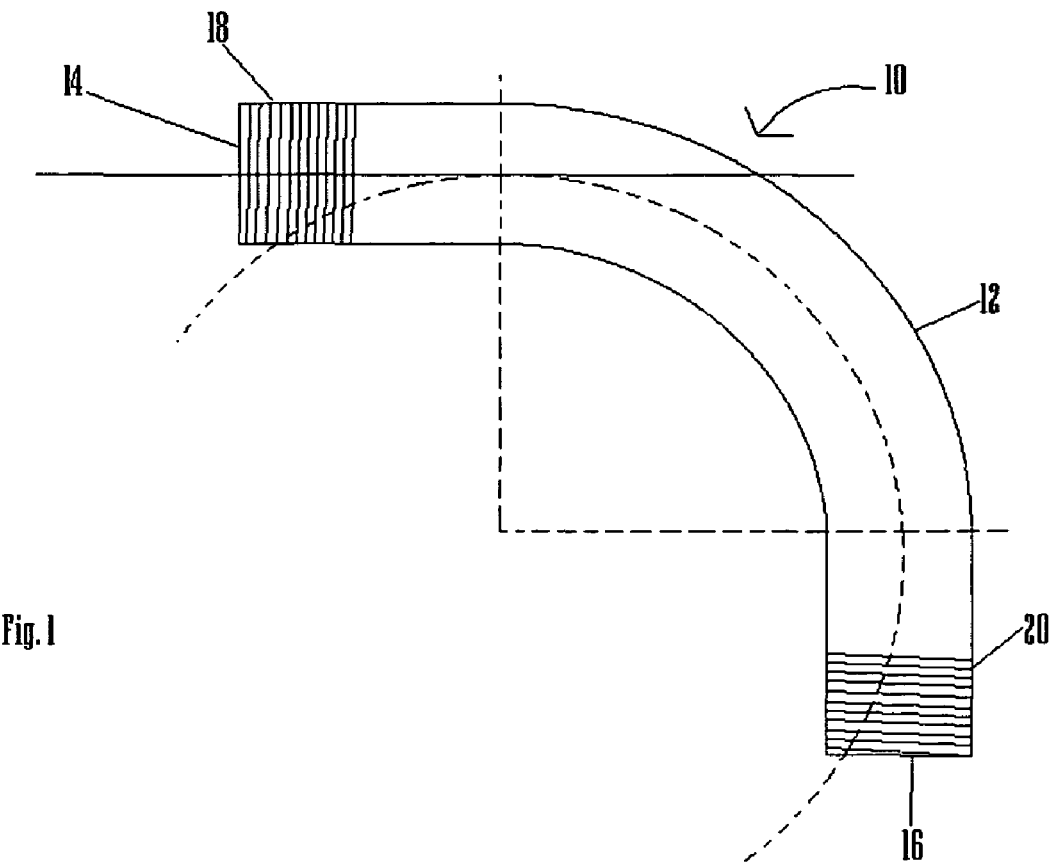
FIG. 1 is a plan view of a conduit piece (not to scale) of the invention.
Figure 6:
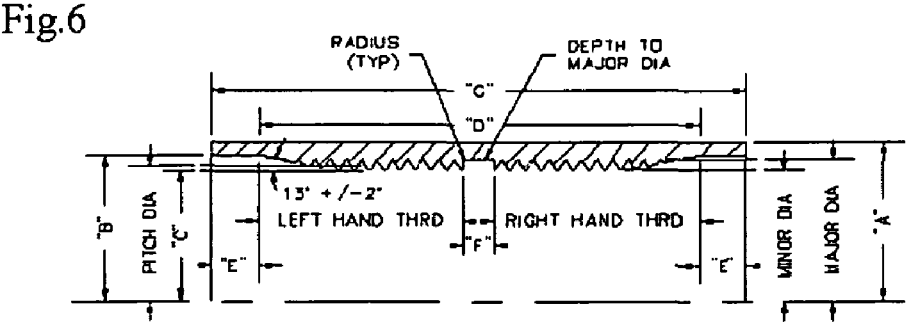
FIG. 6 is a side, sectional view of the upper part of a coupling of the invention (not to scale) showing an exemplary thread profile.

For purposes of the description hereinafter, the terms "upper", "lower", "right", "left", and similar spatial terms shall relate to the invention as it is oriented in the drawing figures. However, it is to be understood that the invention may assume various alternative orientations and step sequences, unless expressly stated to the contrary. It is also to be understood that the specific dimensions illustrated in the attached drawings and described in the following specification are simply exemplary embodiments of the invention and are not to be considered as limiting.

Figure 4:
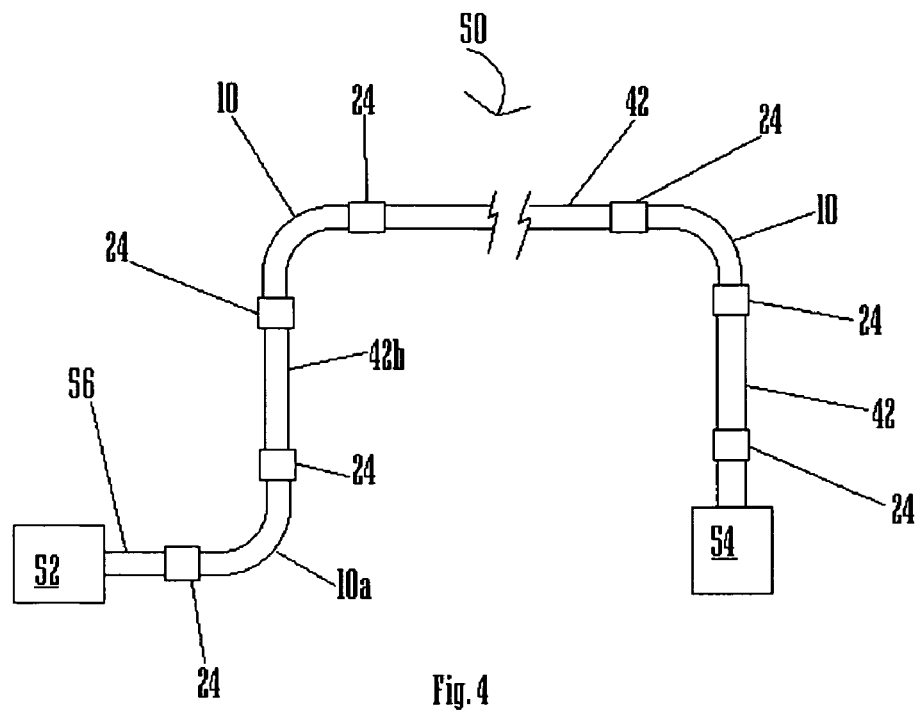
FIG. 4 is a schematic view of an electrical conduit system (not to scale) utilizing a conduit piece and couplings of the invention.
Figure 3:
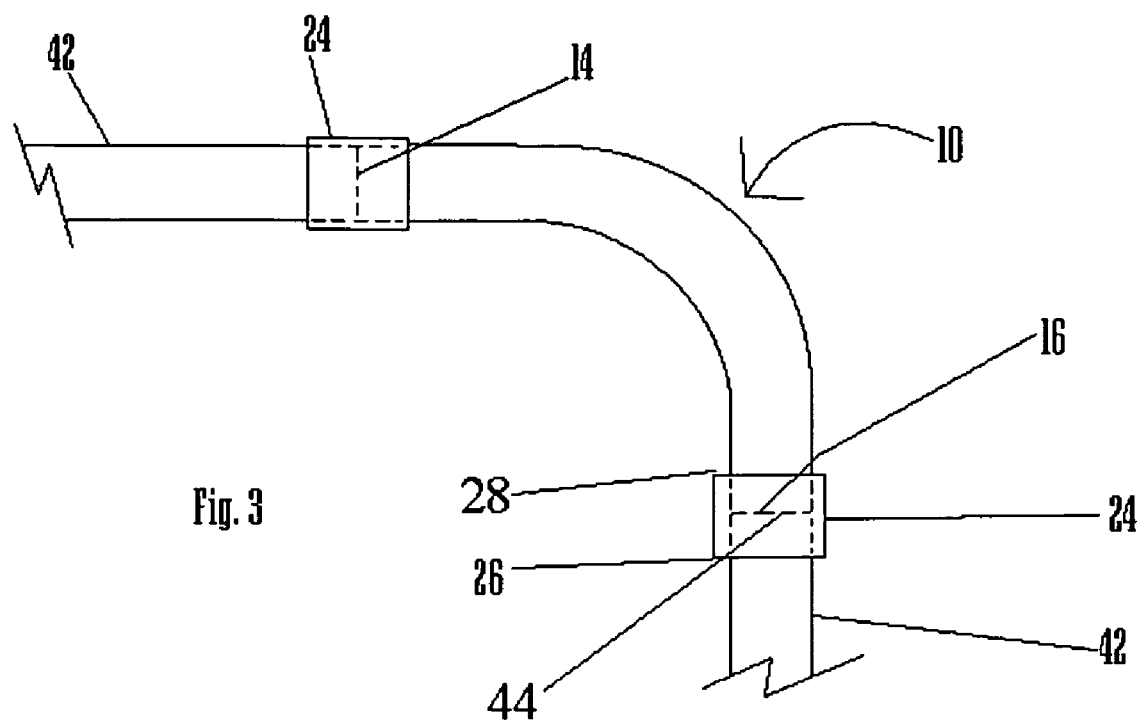
FIG. 3 is a plan view of the conduit piece (not to scale) of FIG. 1 connected by the coupling of FIG. 2 to a conventional conduit system.

A conduit piece of the invention is generally designated 10 in FIGS. 1, 3 and 4. As shown in FIG. 1, the conduit piece 10 is formed of a hollow, substantially cylindrical body 12 made of rigid material, such as PVC or metals such as stainless steel, galvanized carbon steel or aluminum, or similar materials. The conduit piece 10 has a first end 14 and a second end 16. A first threaded region 18 is formed on the outer surface of the conduit piece 10 at or near the first end 14 and a second externally threaded region 20 is formed at or near the second end 16 of the conduit piece 10. In the preferred embodiment of the invention, the threaded regions 18 and 20 are both comprised of threads having the same thread direction, e.g., left hand, tapered or straight threads. While the conduit piece 10 in FIG. 1 is shown as a curved or elbow conduit, it is to be understood that the conduit piece 10 is not limited to elbow conduits but may be of any conventional electrical conduit configuration, e.g., a straight conduit section. The conduit piece 10 is preferably of substantially the same dimensions as standard conventional conduit pieces known in the art.

Figure 2:
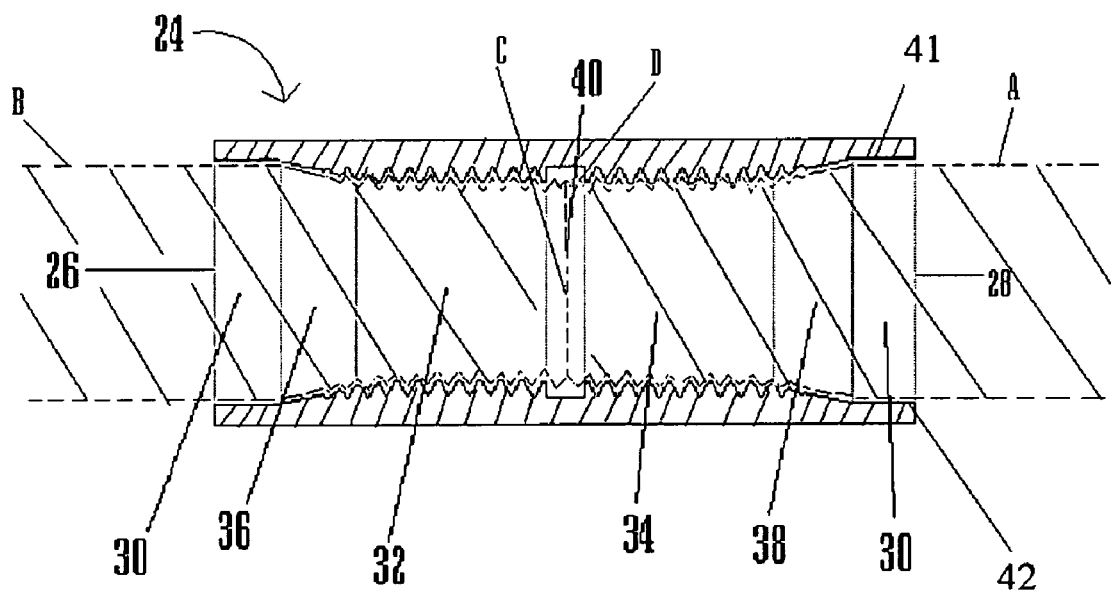
FIG. 2 is a longitudinal, sectional view (not to scale) of a coupling of the invention.

A hollow coupling of the invention is generally designated 24 in FIGS. 2-4. The hollow coupling 24 is preferably substantially cylindrical and may be made from the same materials as the conduit piece 10. The hollow coupling 24 has a first end 26 and a second end 28. An internal recess 30, i.e., a region of larger internal diameter than the central region of the hollow coupling 24, is formed at or near each end 26 and 28 of the hollow coupling 24. The hollow coupling 24 further includes a first internally threaded region 32 and a second internally threaded region 34. As shown in FIG. 2, a first tapered region 36 is located between the left recess 30 and the first threaded region 32 and a second tapered region 38 is located between the right recess 30 and the second threaded region 34. The threaded regions 32 and 34 are preferably comprised of tapered or straight threads of opposed thread directions, e.g., the first threaded region 32 may be comprised of right hand threads and the second threaded region 34 may be comprised of left hand threads. The threaded regions 32 and 34 are preferably of substantially the same length, which thread length preferably substantially corresponds to the length of the threaded regions 18 and 20 on the conduit piece 10. Preferably each threaded region 32 and 34 is configured to provide nine full engagement threads so that the system of the invention meets the requirements of UL®-6 and qualifies as a class one conduit installation.

An internal circumferential groove 40 is formed in the internal wall 41 of the hollow coupling 24 and is preferably located approximately at or near the longitudinal center of the hollow coupling. The internal circumferential groove 40 provides an open groove region in which the ends of conduit pieces inserted into the coupling 24 can abut. For example, FIG. 2 shows two conduit pieces A and B (in phantom) engaged with the hollow coupling 24. The inner end C of conduit piece A abuts the inner end D of conduit piece B in the open area created by the internal circumferential groove 40. This is required for good ground for the system.

Figure 7:
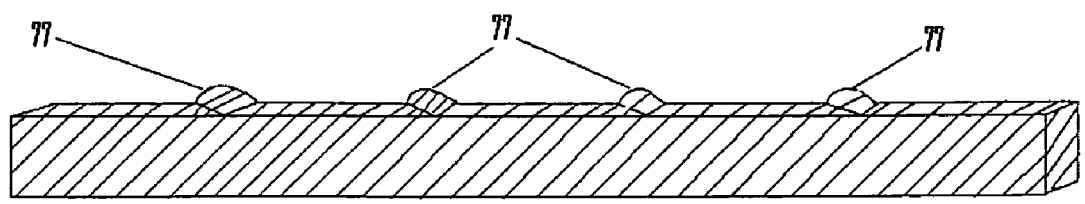
FIG. 7 is a plan view of the locking ring (not to scale) prior to being formed.
Figure 8:
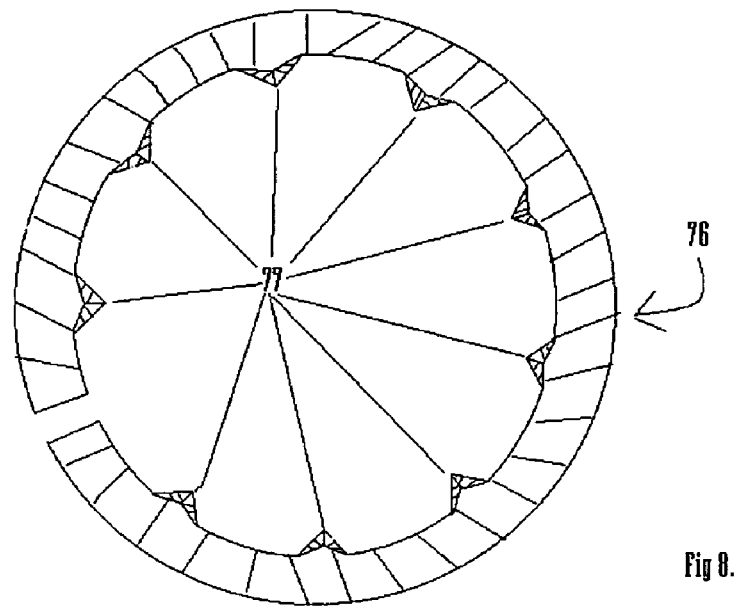
FIG. 8 is a plan view of the locking ring (not to scale) after being formed.

A locking ring of the invention is generally designated 76 in FIGS. 7 and 8. The locking ring resides in the internal circumferential groove, FIG. 2, and is held in place by spring tension. The locking ring has coarse internal threads 77, which score the threads at 90° of any conduit piece upon its reaching section 40 while still allowing the two conduit ends to abut. This, coupled with the friction created by the abutment of the conduit pieces 10, prevents any tangential force exerted upon either one or the other conduit pieces from outside of the system from causing that particular conduit piece to become unscrewed. Such an event could be caused by improper installation of straight pieces to one of the embodiments of the invention.

Use of the conduit piece 10 and hollow coupling 24 of the invention will now be described. FIG. 3 shows how the conduit piece 10 may be coupled by hollow couplings 24 to conventional conduit pieces or sections 42, e.g., straight conduit sections 42 having opposed ends with threaded regions at each end, each threaded region being of the same thread direction, e.g., conventional right hand threads. Looking at the lower hollow coupling 24 in FIG. 3, for example, the first end 26 of the hollow coupling 24 is slipped onto the outer end (first end) 44 of the lower conventional conduit section 42 until the right hand threads on the conventional conduit section 42 contact, abut or initially engage the right hand threads on the first threaded region 32 of the hollow coupling 24. One end, for example the second end 16 of the conduit piece 10 is then inserted into the second end 28 of the hollow coupling 14 until the left hand threads on the second end 16 of the conduit piece 10 contact, abut or initially engage the left hand threads on the second threaded region 34 of the hollow coupling 24 as shown in FIG. 2. Next, the hollow coupling 24 is rotated or turned to simultaneously thread the second end of the conduit piece 10 and first end 44 of the conduit section 42 into the hollow coupling 24 until the inserted ends 44 of the conduit piece 10 and the inserted end 44 of conduit section 42 abut in a similar manner to the conduit pieces A and B in FIG. 2. During this procedure, only the hollow coupling 24, not the conduit piece 10 or conduit section 42, rotates to reversibly couple the conduit piece 10 and conduit section 42. As used herein, the terms "reversibly couple" or "reversibly engage" mean that the coupled conduit pieces can be uncoupled by rotating the hollow coupling 24 in an opposite direction to that used to couple the pieces together.

The recesses 30 permit a small amount of float or play in case the respective ends of the conduit piece 10 and conduit section 42 being coupled are not started at exactly the same thread position in the opposed ends 26 and 28 of the coupling 24. The first end 14 of the conduit piece 10 can be similarly connected to the outer end of the upper conventional conduit section 42 by another coupling 24 of the invention, with the second coupling region 34 (left hand threads) of the upper coupling 24 engaging the left hand threads on the first end 14 of the conduit piece 10 and the first coupling region 32 (right hand threads) of the upper coupling 24 engaging the right hand threads on the outer (first or second) end of the upper conventional conduit section 42. Thus, the elbow-shaped piece 10 does not itself have to be rotated to be connected into an electrical conduit system utilizing standard right hand threaded straight conduit sections 42. This is particularly advantageous with larger elbow-shaped conduit pieces 10, which, in previously known systems would have to be physically rotated and supported, usually by a crew of workers. Additionally, previously known elbow sections could only be placed in areas with sufficient clearance to allow the elbow to be rotated. In the present invention, only the couplings needs to be rotated, not the elbow itself. This greatly reduces the manpower required for coupling large, particularly elbow-shaped, conduit pieces or sections which, in turn, lowers the cost of constructing a conduit system.

An electrical conduit system utilizing conduit pieces 10 and hollow couplings 24 of the invention is designated 50 in FIG. 4. The conduit system 50 extends from a junction box or breaker box 52 to an outlet or breaker 54. In the conduit system 50 shown in FIG. 4, conventional conduit sections 42 having right hand external threaded regions may be used in the construction of the conduit system 50. For example, the conduit system 50 may be initially constructed as follows. A conventional nipple 56 can be connected to the breaker box 52. A first conduit piece 10a of the invention is then connected to the nipple 56 by a first hollow coupling 24 in a similar manner as described above. A second conventional conduit section 42b is then connected to the first conduit piece 10a by a second coupling 24 and so on until the electrical conduit system 50 has been constructed. By alternating conduit pieces 10 of the invention and conventional conduit sections 42 by coupling pieces of 24 of the invention, the entire conduit system 50 may be constructed without the need to rotate the conduit pieces 10 or conventional conduit sections 42 themselves. This greatly reduces the manpower required for construction of the conduit system 50. Further since none of the conduit pieces 10 or conventional conduit sections 42 needs to be rotated, the flexible member, e.g., wire or cable being encased, can be pre-staged or threaded through the respective disassembled conduit pieces 10 or conventional conduit sections 42 before assembly. This means that the cable does not have to be pulled through the finally constructed system and thus reduces the changes of damaging the wire or cable. This is particularly useful with respect to fiber optic cables.

Another advantage of the conduit system 50 over known systems is that the intermediate portion of the conduit system 50 can be easily accessed to examine or repair specific parts of the cable or to add additional conduit runs or branches without having to disassemble the entire conduit system 50. For example, a hollow coupling 24 can be rotated to disassemble the end of one of the conduit pieces 10 from the associated end of an adjacent conventional conduit section 42. All that is required is sufficient clearance of about a thread length, e.g., the length of a threaded region 18 or 20, to allow the end of the selected conduit piece 10 to be withdrawn from the hollow coupling 24. The other end of the conduit piece 10 could then also be disassembled in a similar manner by simply rotating the hollow coupling 24 on the other end of the conduit piece 10.

Alternatively, the conduit piece 10 and hollow couplings 24 of the invention can be retrofitted into an existing electrical conduit system. For example, the cable of the system can be pulled back from one end through the region to be accessed. An existing conduit section having right hand threaded ends can then be removed, such as by cutting, and replaced with a conduit piece 10 and hollow couplings 24 of the invention. This would be particularly useful in retrofitting electrical conduit systems having elbow-shaped pieces located in confined areas, such as within buildings or within the walls of buildings, where portions of the building would normally have to be destroyed to allow sufficient clearance to add or replace an elbow section. This reduces the cost of replacing or retrofitting existing conduit systems. Further, the present invention is also well adapted for use in upgrading or reworking existing electrical conduit systems, such as by adding branch lines. For example, to add a branch line to the conduit system 50 of FIG. 4, one or more of the conduit pieces 10 can be removed as described above and replaced with a conventional junction or branch line. Additionally, since the conduit piece 10 and hollow coupling 24 of the invention can be used with existing conventional right hand threaded conduit sections, the existing inventory of conventional conduit sections can still be used.

Figure 5:
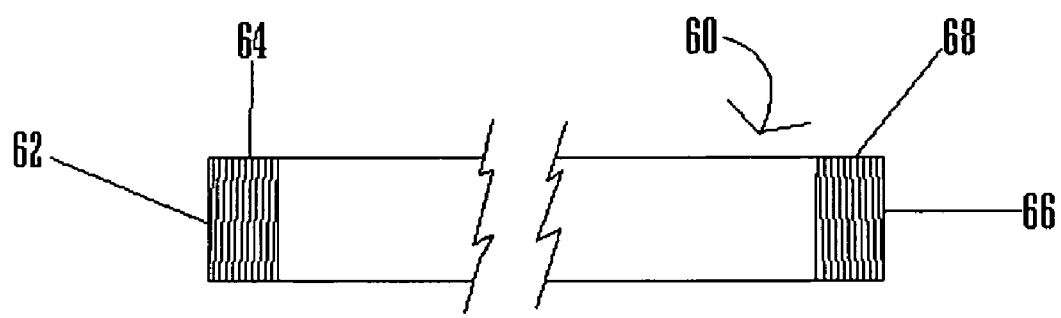
FIG. 5 is a plan view of an alternative conduit piece (not to scale) of the invention.

An alternative embodiment of a conduit piece of the invention is designated 60 in FIG. 5. The alternative conduit piece 60 is configured as a straight conduit piece having a first end 62 with an external, first threaded region 64 and a second end 66 with an external second threaded region 68. In this embodiment, the first threaded region 64 is comprised of left hand threads and the second region 68 is comprised of right hand threads. The coupling piece 24 is particularly well adapted to be placed in the straight section of a conduit run at a position the builder may later wish to access, for example to place a junction box or branch line. The second end 66 of the alternative conduit piece 60 with right hand threads may be conventionally connected to a conventional conduit section with a conventional coupling. However, the first end 62 of the alternative conduit piece 60 can be attached by a hollow coupling 24 of the invention with an adjacent conventional conduit section. This section of the conduit run can be later accessed simply by uncoupling the hollow coupling 24, i.e., rotating the coupling to disengage the first end 62 from the adjacent conduit section and then removing the alternative conduit piece 60 from the conventional coupling by rotating the alternative conduit piece 60.

Another particularly well-adapted use of the conduit piece 10 and hollow couplings 24 is an electrical conduit system for bridge decks encasing fiber optic cables. Presently, the bridge deck conduit sections for fiber optic cables are connected by a complex, right hand threaded coupling. However, these conventional bridge deck couplings can typically be removed by hand or with nothing more than a screwdriver, allowing unauthorized access to the fiber optic or communication cables running through the bridge deck electrical conduit system. This provides little or no protection against vandalism of the cables. However, the present invention improves this protection. By constructing a bridge deck electrical conduit system utilizing the conduit piece 10 and hollow couplings 24 of the invention but which does not allow sufficient clearance to uncouple the end of a conduit piece 10 from an adjacent hollow coupling 24, the bridge deck conduit system cannot be accessed.

It will be readily appreciated by those skilled in the art that modifications may be made to the invention without departing from the concepts disclosed in the foregoing description. Such modifications are to be considered as included within the scope of the invention. Accordingly, the particular embodiments described in detail herein are illustrative only and are not limiting to the scope of the invention, which is to be given full breadth of the appended claims and any and all equivalents thereof.

What is claimed is:

1. An electrical conduit system for encasing and protecting flexible wires or cables, said electrical conduit system comprising:
    a) a plurality of first conduit pieces, each first conduit piece having a first end with a first threaded region in a first thread direction and a second end with a second threaded region running in said first thread direction;
    b) at least one second conduit piece having one said first end with said first threaded region and one second end with said second threaded region, with a second thread direction being different than said first thread direction; and
    c) at least one coupling, said coupling comprising a first threaded portion and a second threaded portion, with said first threaded portion having a different thread direction than said second threaded portion, with said first threaded portion of said coupling configured to reversibly engage said first threaded region on said first conduit piece and with said second threaded portion of said coupling configured to reversibly engage said second threaded region on said conduit piece, acting to reversibly couple said first conduit piece with said second conduit piece; wherein said coupling insures abutment of said ends of said two conduit pieces, providing an electrical ground which passes through said conduit piece ends, but does not pass through said coupling;
    d) at least one locking ring, having a circular inside, and said locking ring comprising a coarse threaded portion, said coarse threaded portion being oriented on said circular inside of said locking ring, and said coarse threads being aligned perpendicular to said circular inside, with said locking ring being formed to less than 360° and formed from a spring steel of suitable hardness; wherein said electrical conduit system further provides the specified amount of thread engagement to meet various sealing and cooling capabilities required by the various electrical codes in their stricter requirements, and said electrical conduit system further provides a conduit installation that is not larger than any part of a normal installation, a normal installation being a common and appropriate size for the particular location and type of installation as generally understood and known in the art, and which allows the closes parallel conduit runs allowed within the size of conduit run.

2. An electrical conduit system for encasing and protecting flexible wires or cables, said electrical conduit system comprising:
    a) a plurality of first conduit pieces, each first conduit piece having a first end with a first externally threaded region in a right hand thread direction, and a second end with a second externally threaded region in a right hand thread direction; and,
    b) a plurality of second conduit pieces, each second conduit piece having a first end with a first externally threaded region in a left hand thread direction, and a second end with a second externally threaded region in a left hand thread direction; and,
    c) at least one coupling, said coupling comprised of a first, internally right hand threaded portion, said first internally right hand threaded portion being configured to engage an end of a said first conduit piece; and, a second, internally, left hand threaded portion configured to engage an end of a said second conduit piece; and, said coupling also having an internal grooved region positioned such that when said first and second conduit piece ends are threaded into said coupling, said coupling insures abutment of said ends of said first and second conduit pieces in said internal grooved region, providing an electrical ground which does not pass through said conduit piece ends, but does not pass through said coupling; and
    d) a locking ring abiding in said internal grooved region of said coupling, and said locking ring having a circular inside having a coarse threaded region, and as said ends of said first and second conduit pieces are inserted into said grooved region, they are scored at 90° by said coarse threads of said locking ring; said electrical conduit system further provides the specified amount of thread engagement to meet the various sealing and cooling capabilities required by the various electrical codes in their stricter requirements; said electrical conduit system further providing an electrical conduit installation that is not larger than any part of a normal installation, a normal installation being a common and appropriate size for the particular location and type of installation as generally understood and known in the art, and which allows the closes parallel conduit runs allowed within the size of conduit run.

* * * * *